(12) United States Patent
Sasaki (10) Patent No.: US 10,338,455 B2
(45) Date of Patent: Jul. 2, 2019

(54) CAMERA AND METHOD FOR CONTROLLED DEW FORMATION INSIDE A CAMERA

(71) Applicant: AXIS AB, Lund (SE)

(72) Inventor: Daisuke Sasaki, Tokyo (JP)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/104,326

(22) Filed: Aug. 17, 2018

(65) Prior Publication Data

US 2019/0056641 A1    Feb. 21, 2019

(30) Foreign Application Priority Data

Aug. 21, 2017  (EP) ..................................... 17187090

(51) Int. Cl.
| | |
|---|---|
| *G03B 17/08* | (2006.01) |
| *G03B 17/55* | (2006.01) |
| *H04N 5/225* | (2006.01) |
| *G03B 17/02* | (2006.01) |

(52) U.S. Cl.
CPC ............. *G03B 17/08* (2013.01); *G03B 17/02* (2013.01); *G03B 17/55* (2013.01); *H04N 5/22521* (2018.08)

(58) Field of Classification Search
None
See application file for complete search history.

(56) References Cited

U.S. PATENT DOCUMENTS

| | | | |
|---|---|---|---|
| 4,984,089 A | 1/1991 | Stiepel et al. | |
| 5,689,735 A * | 11/1997 | Horning .................. | G03B 17/08 396/29 |
| 6,161,087 A | 12/2000 | Wightman et al. | |
| 6,507,700 B1 * | 1/2003 | Takekuma ............. | G03B 17/08 348/81 |
| 6,574,492 B1 * | 6/2003 | Ben-Haim ........... | A61B 5/0215 600/374 |
| 7,627,235 B2 | 12/2009 | McCutchen et al. | |
| 2005/0213960 A1 * | 9/2005 | Baldwin ................ | G03B 17/02 396/439 |

(Continued)

FOREIGN PATENT DOCUMENTS

| | | |
|---|---|---|
| CN | 201477340 U | 5/2010 |
| EP | 1 608 152 A2 | 12/2005 |

(Continued)

OTHER PUBLICATIONS

EP 17 18 7090.0 European Search Report (dated Mar. 9, 2018).

*Primary Examiner* — William B Perkey
(74) *Attorney, Agent, or Firm* — Volpe and Koenig, P.C.

(57) ABSTRACT

A camera comprising an at least partly transparent housing and an imaging device arranged inside the at least partly transparent housing, wherein the imaging device is configured to capture images through the at least partly transparent housing. The camera further comprising a casing at least partly enclosing the imaging device and arranged between the housing and the imaging device, the casing defining at least one cavity forming an intermediate space being in fluid communication with an inner space present between the casing and the imaging device and an outer space present between the housing and the casing. A method for controlled dew formation inside the camera.

15 Claims, 4 Drawing Sheets

(56) References Cited

U.S. PATENT DOCUMENTS

| | | | |
|---|---|---|---|
| 2005/0276599 A1* | 12/2005 | Kajino | H04N 5/2252 396/419 |
| 2006/0171704 A1* | 8/2006 | Bingle | B60R 11/04 396/419 |
| 2010/0272427 A1* | 10/2010 | Jung | G03B 17/00 396/427 |
| 2011/0073142 A1* | 3/2011 | Hattori | B60S 1/0848 134/56 R |
| 2012/0008935 A1* | 1/2012 | Cheng | G03B 17/02 396/535 |
| 2015/0049242 A1* | 2/2015 | Kondou | G03B 17/02 348/374 |
| 2015/0256729 A1 | 9/2015 | Wato | |
| 2015/0326759 A1* | 11/2015 | Mukai | G03B 17/02 348/374 |
| 2016/0119513 A1* | 4/2016 | Sasaki | H04N 5/2251 348/373 |
| 2017/0131621 A1* | 5/2017 | Tang | B64D 47/08 |
| 2017/0184945 A1* | 6/2017 | Carlson | B60R 11/04 |
| 2018/0091775 A1* | 3/2018 | Jung | G03B 17/02 |
| 2018/0338075 A1* | 11/2018 | Tagaya | H04N 5/2254 |
| 2019/0056641 A1* | 2/2019 | Sasaki | G03B 17/02 |

FOREIGN PATENT DOCUMENTS

| | | |
|---|---|---|
| EP | 1 608 152 A3 | 12/2005 |
| JP | 2012039193 A1 | 2/2014 |
| WO | 2004/047421 A2 | 6/2004 |
| WO | 2004/047421 A3 | 6/2004 |

\* cited by examiner

CAMERA AND METHOD FOR CONTROLLED DEW FORMATION INSIDE A CAMERA

FIELD OF THE INVENTION

A camera and a method for controlled dew formation inside such a camera.

BACKGROUND ART

A camera such as a network camera may be used in many different situations, both indoors and outdoors, to monitor a scene. The camera is often arranged for rotation and/or tilting in order to enable image acquisition from different positions in the specific area.

The camera may comprise an at least partly transparent housing, such as a hemispherical dome window, and an imaging device arranged inside the housing and configured to capture images through the housing.

In environments where water vapour is present in the ambient air, the vapour may condense on the inside surface of the housing, also referred to as dew formation. Dew formation occurs when dew formation conditions are fulfilled, the dew formation conditions including air humidity, air temperature outside the camera and temperature inside the camera.

Dew formation may thus happen when the ambient temperature outside the camera drops, such as in the evening, and the air surrounding the camera cools down more quickly than the camera itself, resulting in the housing cooling down before the rest of the camera. Heat generated by the imaging device may also contribute to causing a temperature difference between the inside and the outside of the camera.

Prior art solutions addressing this issue may involve provision of a housing with a double-walled window structure with an insulated space (such as vacuum) separating the two windows of the window structure or provision of an air blowing nozzle powered by a fan directed towards the inner surface of the housing.

SUMMARY

An improved camera and a method addressing problems associated with dew formation inside the camera are presented.

A camera having the features defined in claim 1 and a method having the features defined in claim 15 are provided. Embodiments of the camera and the method will be evident from the dependent claims.

More specifically, there is provided according to a first aspect a camera comprising an at least partly transparent housing and an imaging device arranged inside the at least partly transparent housing, wherein the imaging device is configured to capture images through the at least partly transparent housing. The camera further comprises a casing at least partly enclosing the imaging device and arranged between the housing and the imaging device, the casing defining at least one cavity forming an intermediate space being in fluid communication with an inner space present between the casing and the imaging device and an outer space present between the housing and the casing.

Hereby, a camera addressing problems associated with dew formation inside the camera is provided. The provision of a casing having at least one cavity forming an intermediate space being in fluid communication with the inner space and the outer space allows for air to flow from the inner space to the outer space via said intermediate space. Thus, when dew formation conditions are fulfilled, such as in the evening when the outside temperature drops causing a cooling of the camera beginning with the housing, a controlled dew formation may be obtained on surfaces of the intermediate space as air flows from the inner space to the outer space via the intermediate space. The thus dehumidified air subsequently flowing from the intermediate space to the outer space may then cause a reduced dew formation on the inner surface of the housing.

The term "cavity" shall in this context be construed as an unfilled space within a structure, i.e., a demarcated space within the structure.

According to an embodiment, the casing may comprise two main sections, which in an assembled state define the at least one cavity, wherein the at least one cavity is in fluid communication with the inner space and the outer space through a passage formed at a joint between the two main sections. The casing comprising two main sections may be easily assembled such that it encloses the imaging device, wherein the passage formed by the joint between the two sections ensures that the intermediate space is in fluid communication with the inner space and the outer space. The two main sections may loosely abut against each other such that the passage formed by the joint provides a sufficient restricted air flow, allowing the air to be detained in the intermediate space for a sufficient time for obtaining the controlled dew formation.

According to another embodiment, the inner space may be in fluid communication with the outer space only via the intermediate space formed by the at least one cavity. Hereby it may be ensured that air flowing from the inner space to the outer space must pass through the intermediate space.

According to yet another embodiment, the casing may be movably arranged relative the housing. Also, the casing may be movably arranged in unison with the imaging device.

According to yet another embodiment, the casing may comprise a rear section arranged at a rear side of the imaging device and provided with cooling flanges or cooling fins.

According to yet another embodiment, the casing may comprise a rear section arranged at a rear side of the imaging device and made of a high heat conductivity material, i.e. a material having a high thermal conductivity such as aluminum.

The provision of a rear section provided with cooling fins and/or being made of a high heat conductivity material, may have a cooling effect on the temperature inside the inner space, and a lowered temperature in the inner space may have a reducing effect on the water vapour amount of the air inside the inner space.

The imaging device may comprise front side, wherein the rear section may be arranged at a rear side of the imaging device opposite to front side. A lens unit may be arranged at the front side of the imaging device. The inner space may be in fluid communication with the outer space only via the intermediate space formed by the at least one cavity, and via a rear passage of the casing arranged at or in the rear section. By arrangement of the rear section on the side of the imaging device opposite to the front side where the lens unit may be arranged, it may be ensured that any dew formation resulting from air flowing from the inner space to the outer space through the rear passage may occur on the inside surface of the housing in an area corresponding to the side opposite to the imaging direction of the imaging device.

According to yet another embodiment, the casing may comprise a plurality of cavities.

According to yet another embodiment, the imaging device may comprise a lens unit protruding from a front side of the imaging device and the at least one cavity may comprise an annular cavity, wherein the annular cavity circumferentially encloses the lens unit.

According to yet another embodiment, the at least partly transparent housing may be a dome window.

According to yet another embodiment, the casing may have a multi-walled structure forming the at least one cavity. The multi-walled structure may comprise an outer wall, an inner wall and a partition wall.

According to yet another embodiment, the housing may have a free volume VF defined as the difference between a housing volume VH of the housing and a device volume VD of the imaging device, wherein the at least one cavity has a cavity volume VC corresponding to 10-30% of the free volume VF.

According a second aspect, a method is provided for controlled dew formation inside a camera comprising an at least partly transparent housing and an imaging device arranged inside the at least partly transparent housing, wherein the imaging device is configured to capture images through the at least partly transparent housing. The method comprises arranging a casing between the housing and the imaging device such that the casing at least partly encloses the imaging device, the casing defining at least one cavity forming an intermediate space being in fluid communication with an inner space present between the casing and the imaging device and with an outer space present between the housing and the casing. The method further comprises allowing air to flow from the inner space to the outer space via the intermediate space such that a controlled dew formation on surfaces of the at least one cavity is obtained when dew formation conditions are fulfilled, the dew formation conditions at least including air humidity, ambient temperature outside the camera and temperature inside the inner space.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present teachings, will be better understood through the following illustrative and non-limiting detailed description of embodiments of the present teachings, with reference to the appended drawings, where the same reference numerals will be used for similar elements, wherein.

DESCRIPTION OF EMBODIMENTS

The present teachings will now be described more fully hereinafter with reference to the accompanying drawings, in which embodiments are shown. The teachings may, however, be embodied in many different forms and should not be construed as limited to the embodiments set forth herein; rather, these embodiments are provided for thoroughness and completeness, and to fully convey the scope of the teachings to the skilled person.

Figure 1:
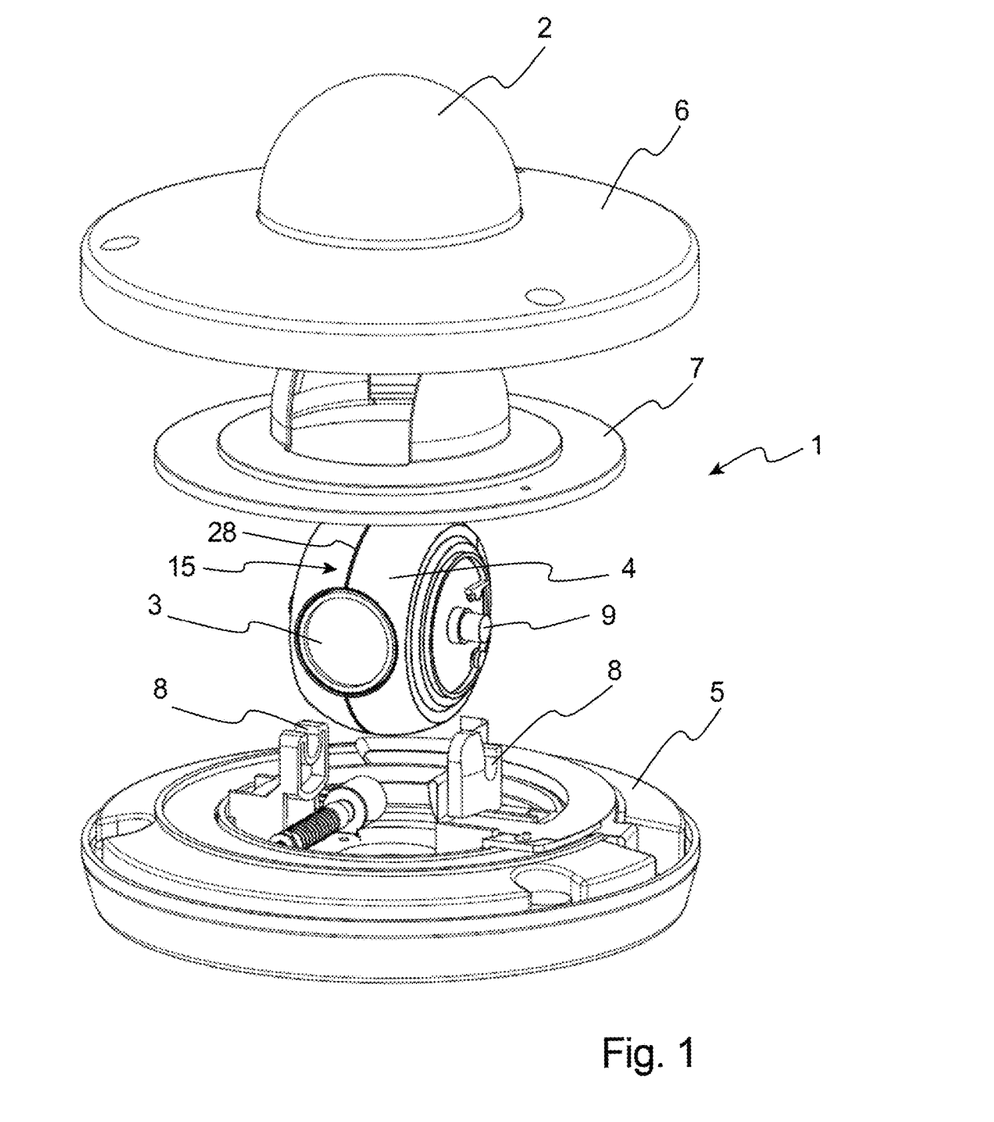
FIG. 1 is a perspective view in exploded form of a camera in accordance with the present teachings.

An exploded view of a camera 1 in accordance with an embodiment is shown in FIG. 1.

The camera 1 comprises an at least partly transparent housing 2 and an imaging device 3 arranged inside the housing 2. A casing 4 is provided, partly enclosing the imaging device 3 and arranged between the housing 2 and the imaging device 3.

The housing 2 of the shown camera 1 is in the form of a dome window and may be made of a plastic material such as PMMA or PC.

The shown camera 1 further comprises a base unit 5, a top case 6 and an inner cover 7. The base unit 5 comprises two bearing seats 8 each arranged to support a shaft journal 9 of the casing 4 for mounting thereof on the base unit 5.

The casing 4 may be movably arranged relative the housing 2 and may be movable in unison with the imaging device 3. More specifically, the casing 4 and the imaging device 3 may be movable by tilting and/or rotation inside the housing 2. Drive means may be provided for movement of the casing 4 and the imaging device 3.

Figure 2A:
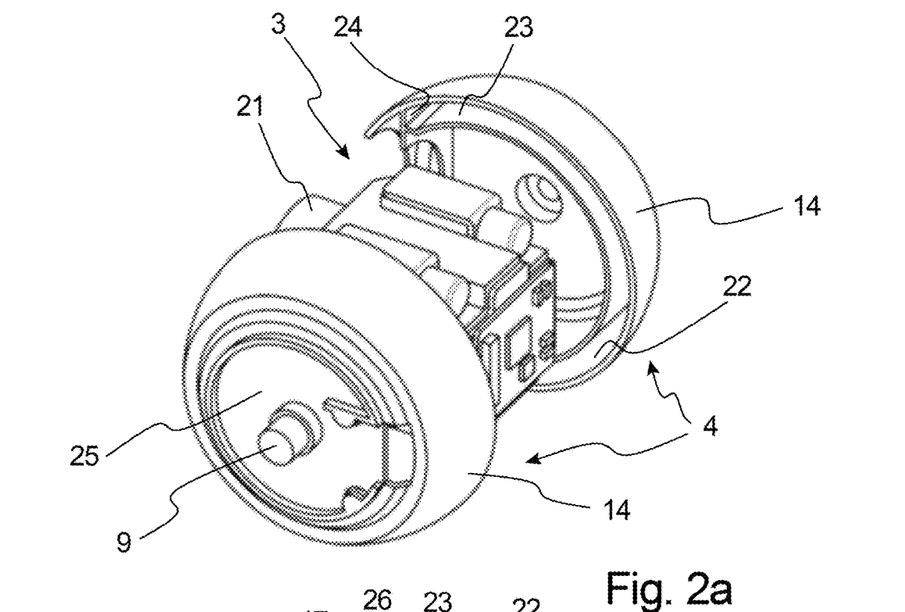
FIG. 2a is a perspective view in exploded form of a first embodiment of a casing enclosing an imaging device of a camera in accordance with the present teachings.
Figure 2B:
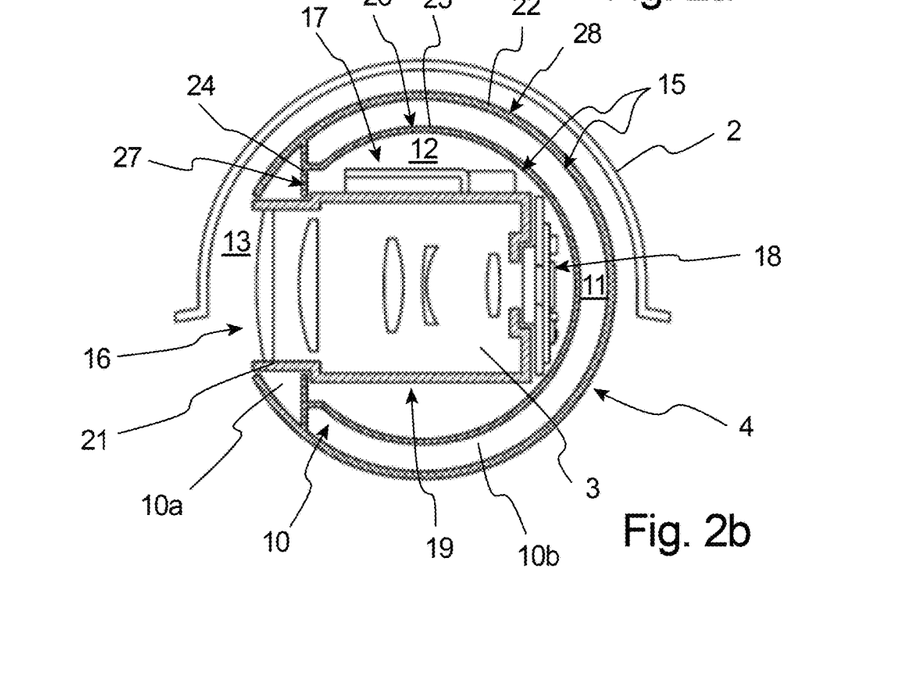
FIG. 2b is a schematic cross sectional view of the casing according to the first embodiment shown in FIG. 2b enclosing the imaging device and arranged inside a housing.

As may be seen more clearly in FIGS. 2a and 2b, the casing 4 defines at least one cavity 10 forming an unfilled, demarcated space within the casing 4. The unfilled space thus constitutes an intermediate space 11 defined by the casing 4 and being in fluid communication with an inner space 12 present between the casing 4 and the imaging device 3, and an outer space 13 present between the housing 2 and the casing 4.

The casing 4 of the shown camera comprises two main sections 14 which in the assembled state defines the at least one cavity 10, wherein the intermediate space 11 formed by the at least one cavity 10 is in fluid communication with the inner space 12 and the outer space 13 through a passage 15 formed by a joint between the two main sections 14. It is understood that the casing may comprise additional sections.

The cavity volume VC of the at least one cavity 10 may be in the range of 10-30% of the free volume VF of the housing 2, the free volume VF being defined as the difference between a housing volume VII of the housing 2 and a device volume VD of the imaging device 3.

In the embodiment of the casing 4 shown in FIGS. 2a and b, the casing 4 comprises two main sections 14, and in FIG. 2a, the two main sections 14 are shown in an exploded view on opposite sides of the imaging device 3. The imaging device 3 has a front side 16, a top side 17, a rear side 18, a bottom side 19 and two mutually opposite lateral sides. In the shown embodiment, the imaging device 3 comprises a lens unit 21 protruding at the front side 17.

The casing 4 has a multi-walled structure. More specifically, each main section 14 comprises an outer wall 22, an inner wall 23 and a partition wall 24, and in an assembled state of the two main sections the multi-walled structure defines a first 10a and a second cavity 10b forming the intermediate space 11. The first cavity 10a, defined on all sides by the casing 4 and the lens unit 21, is annular and circumferentially encloses the lens unit 21. The second cavity 10b, defined on all sides by the casing 4, has a curved extension enclosing the top side 17, the rear side 18 and the bottom side 19 of the imaging device 3. The first and second cavities 10a, b are clearly shown in the cross sectional view shown in FIG. 2b illustrating the casing 4 and the imaging device 3 arranged inside the housing 2. Each main section 14 further comprises a side wall 25 supporting the centrally arranged shaft journal 9. In the assembled state of the two main sections 14, each side wall 25 extends over a respective lateral side of the imaging device 3.

The first and the second cavities 10a, b form the intermediate space 11 being in fluid communication with the inner space 12 present between the imaging device 3 and the casing 4 and with the outer space 13 present between the housing 2 and the casing 4.

The intermediate space 11 is in fluid communication with the inner space 12 and the outer space 13 through a passage 15 formed at a joint between the two main sections 14 of the casing 4. The joint comprises an inner joint 26 formed by end surfaces of the inner walls 23 of the two main sections 14 abutting against each other; an intermediate joint 27 formed by end surfaces of the partition walls 24 of the two main sections 14 abutting against each other; and an outer joint 28 formed by end surfaces of the outer walls 22 of the two main sections 14 abutting against each other. The outer joint 28 forming part of the passage 15 may be more clearly seen in FIG. 1. The inner joint 26 forms the passage between the inner space 12 and the second cavity 10b of the intermediate space 11; the intermediate joint 27 forms the passage between the inner space 12 and the first cavity 10a of the intermediate space 11; and the outer joint 28 forms the passage between the intermediate space 11 and the outer space 13. A further passage may be formed between the casing 4 and the protruding lens unit 21.

According to the shown embodiment, the inner space 12 is in fluid communication with the outer space 13 only via the intermediate space 11 which means that air can only flow between the inner space 12 and the outer space 13 via the intermediate space 11.

A camera 1 with a structure as described with reference to FIGS. 2a and b enables controlled dew formation when dew formation conditions are fulfilled.

Dew formations conditions may be fulfilled in cases where, depending on the air humidity, a sufficient difference in temperature exists between the outside of the camera and the inside of the camera, A difference in temperature may arise for instance during the evening when the outside temperature drops, and as a result the camera 1 will start to cool down beginning with the housing 2, subsequently the casing 4 and last the imaging device 3. Thus, the inside temperature inside the camera 1 will be higher than the outside temperature, and will not be uniform.

As mentioned above, the inner space 12 is, according to the shown embodiment, in fluid communication with the outer space 13 only via the intermediate space 11. Thus, when air flows from the inner space 12 to the outer space 13 via the intermediate space 11, a controlled dew formation on surfaces of the cavities 10a, b forming said intermediate space 11 is obtained once the dew formation conditions are fulfilled. The thus dehumidified air may then flow from the intermediate space 11 to the outer space 13. Some dew formation on the inside surface of the housing 2 may still occur, but as the air is dehumidified, the dew formation on the inside surface of the housing 2 will be reduced.

The intermediate space 11 is in fluid communication with the inner space 12 and the outer space 13 such that air flowing from the inner space 12 to the outer space 13 via the intermediate space 11 is detained in the intermediate 11 space for a sufficient time for obtaining controlled dew formation on the surfaces of the cavities 10a, b forming said intermediate space 11. It has been found that a passage 15 providing a sufficiently restricted air flow is obtained by the joint formed by the two main sections 14 loosely abutting against each other.

Figure 3A:
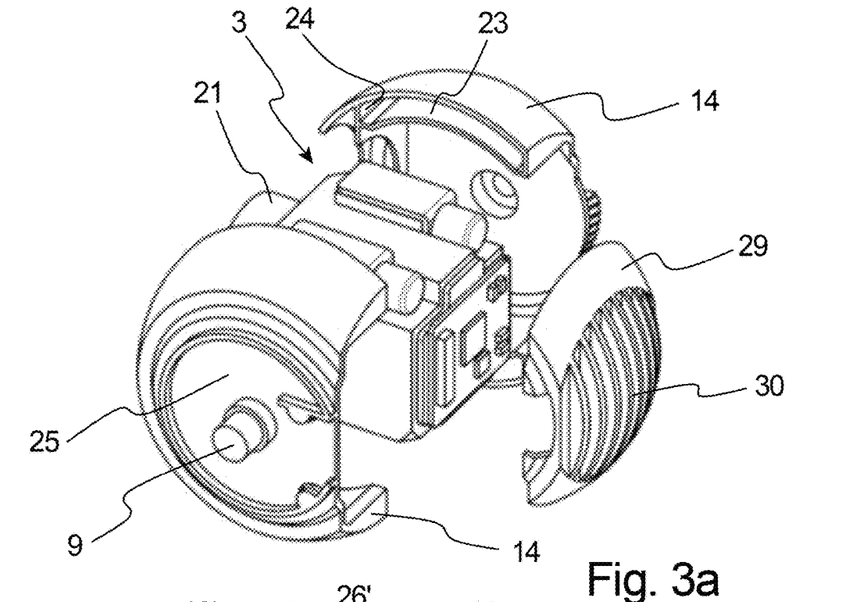
FIG. 3a is a perspective view in exploded form of a second embodiment of a casing enclosing an imaging device of a camera in accordance with the present teachings.
Figure 3B:
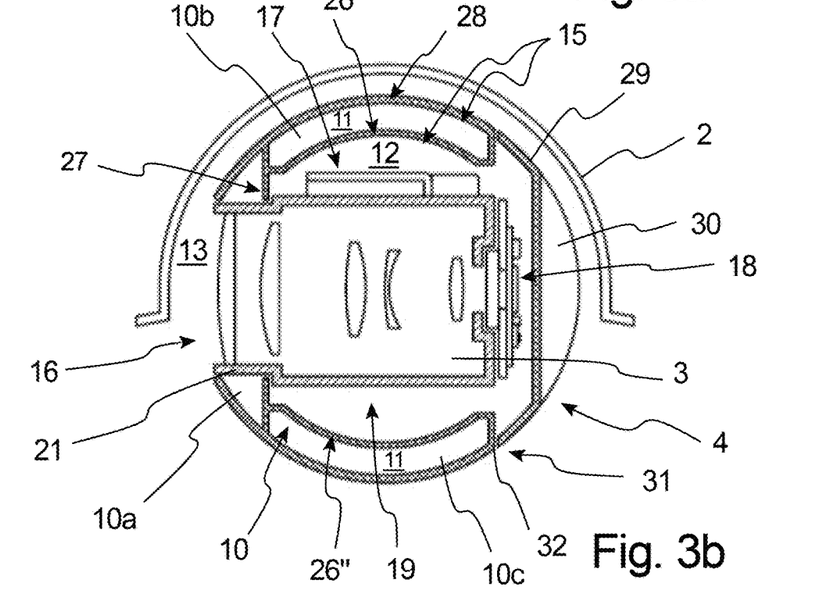
FIG. 3b is a schematic cross sectional view of the casing according to the second embodiment shown in FIG. 3a enclosing the imaging device and arranged inside a housing.

A second embodiment of the casing 4 is shown in FIGS. 3a and b.

The casing 4 comprises two main sections 14 and a rear section 29, and in FIG. 3a, the three sections 14, 29 are shown in an exploded view surrounding the imaging device 3 of the type described with reference to the first embodiment of the casing.

The main sections 14 have a multi-walled structure and define in an assembled state a first 10a, a second 10b and a third 10c cavity forming the unfilled space constituting the intermediate space 11. The first cavity 10a is annular and radially encloses the lens unit 21. The second cavity 10b extends over the top side 17 of the imaging device 3 and the third cavity 10c extends over the bottom side 19 of the imaging device 3. The first, second and third cavities 10a, b, c are clearly shown in the cross sectional view shown in FIG. 3b illustrating the casing 4 and the imaging device 3 arranged inside the housing 2. Each main section 14 further comprises a side wall 25 supporting a centrally arranged shaft journal 9. In the assembled state of the two main sections 14, each side wall 25 extends over a respective lateral side of the imaging device 3.

In accordance with the present teachings, the casing 3 may be provided with cooling fins 30, which in the assembled state of the casing may be located at the rear side 18 of the imaging device 3, i.e. on a side of the imaging device 3 opposite to the lens unit 21. In the shown embodiment, the rear section 29 of the casing 4 forms a rear part of the casing 4 and is provided with cooling fins 30.

In accordance with the present teachings, the casing may comprise a section made of a high heat conductivity material such as aluminum. The section may be located at the rear side 18 of the imaging device 3, i.e. on a side of the imaging device 3 opposite to the lens unit 21. Thus, the rear section 29 of the casing 4 shown in FIGS. 3a, b may be made of a high heat conductivity material.

The cavities 10a, b, c of the casing 4 form the intermediate space 11 being in fluid communication with the inner space 12 present between the imaging device 3 and the casing 4 and with the outer space 13 present between the housing 2 and the casing 4.

The intermediate space 11 is in fluid communication with the inner space 12 and the outer space 13 through a passage 15 formed at a joint between the two main sections 14 of the casing 4. The joint comprises an inner joint, an intermediate joint 27 and an outer joint 28. A first part 26' of the inner joint forms the passage between the inner space 12 and the second cavity 10*b* and a second part 26" of the inner joint forms the passage between the third cavity 10*c* and the inner space 12; the intermediate joint 27 forms the passage between the inner space 12 and the first cavity 10*a*; and the outer joint 28 forms the passage between the intermediate space 11 and the outer space 13. A further passage may be formed between the casing 4 and the protruding lens unit 21.

A rear passage 31 may be provided at the rear part of the casing 4. In the shown embodiment, the rear passage 31 is formed by a rear joint 32 between the main sections 14 and the rear section 29.

According to the shown embodiment, the inner space 12 is in fluid communication with the outer space 13 only via the intermediate space 11 or via the rear passage 31. Thus, air can only flow between the inner space 12 and the outer space 13 via the intermediate space 11 or via the passage 31 formed by the rear joint 32.

A camera 1 with a structure as described with reference to FIGS. 3*a* and *b* enables controlled dew formation when dew formation conditions are fulfilled.

The provision of a casing 4 with a rear section 29 provided with cooling fins 30 and/or made of a high heat conductivity material may have a cooling effect on the temperature inside the inner space 12 as heat generated by the imaging device 3 may be transferred from the inner space 12 by the rear section 29. As the ability for air to sustain water vapour is dependent on air temperature, a reduction of the temperature inside the inner space 12 may reduce the amount of water vapour present in the air inside the inner space 12 and thus reduce the amount of water vapour available for dew formation as the air flows from the inner space 12.

Air flowing from the inner space 12 to the outer space 13 via the intermediate space 11 will be dehumidified when dew formation conditions are fulfilled in a manner similar to that previously described with reference to FIGS. 2*a* and *b*.

Air flowing from the inner space 12 to the outer space 14 via the passage 31 formed by the rear joint 32 may result in dew formation on the inner surface of the housing 2. However, as the rear joint 32 is situated at the rear side 18 of the imaging device 3, the dew formation will occur in an area of the inner surface of the housing 2 corresponding to a side opposite to an imaging direction of the imaging device 3 and thus not obstruct the current field of view of the camera 1.

Figure 4A:
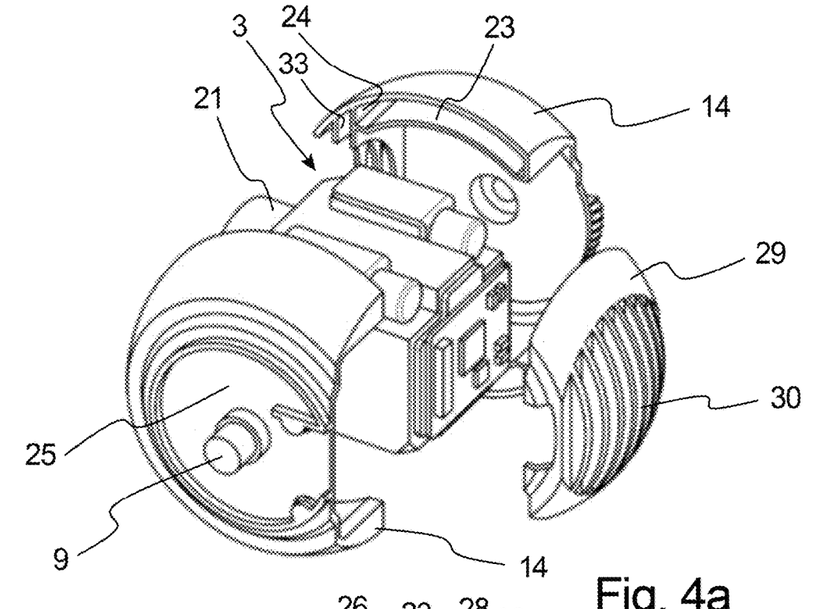
FIG. 4a is a perspective view in exploded form of a third embodiment of a casing enclosing an imaging device of a camera in accordance with the present teachings.
Figure 4B:
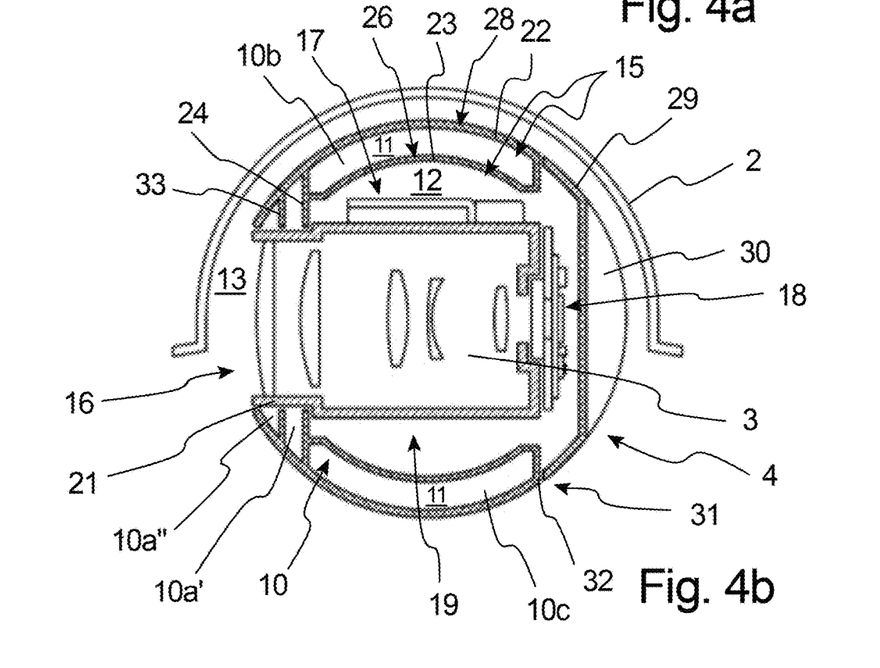
FIG. 4b is a schematic cross sectional view of the casing according to the third embodiment shown in FIG. 4a enclosing the imaging device and arranged inside a housing.

A third embodiment of the casing 4 is shown in FIGS. 4*a* and *b*.

The casing 4 has a similar structure to that described with reference to FIGS. 3*a* and *b*, with the difference that the first cavity is divided by an additional partition wall 33 into a first 10*a*' and second 10*a*" sub cavity arranged side by side in the longitudinal direction of the lens unit 21. Thus, air flowing from the inner space 12 to the outer space 13 via the first cavity of the intermediate space 11 may pass the first sub cavity 10*a*' and then the second sub cavity 10*a*" and dew formation may thus occur twice. The air passing to the outer space 13 via the two sub cavities 10*a*' and 10*a*" will enter the outer space 14 at a location close to the viewing direction of the imaging device 3, and since that air has been dehumidified in two steps, dew formation may be reduced in the area of the inner surface of the housing 2 covering said viewing direction.

It will be appreciated that the present teachings is not limited to the embodiments shown. Several modifications and variations are conceivable within the scope of the teachings which thus is exclusively defined by the appended claims.

The invention claimed is:

1. A camera comprising
an at least partly transparent housing and an imaging device arranged inside the at least partly transparent housing,
wherein the imaging device is configured to capture images through the at least partly transparent housing;
the camera further comprising a casing at least partly enclosing the imaging device and arranged between the housing and the imaging device,
the casing defining at least one cavity forming an intermediate space being in fluid communication with an inner space present between the casing and the imaging device and an outer space present between the housing and the casing.

2. The camera according to claim 1, in which the casing comprises two main sections which in an assembled state defines the at least one cavity, wherein the at least one cavity is in fluid communication with the inner space and the outer space through a passage formed at a joint between the two main sections.

3. The camera according to claim 1, wherein the inner space is in fluid communication with the outer space only via the intermediate space formed by the at least one cavity.

4. The camera according to claim 1, wherein the casing is movably arranged relative the housing.

5. The camera according to claim 4, wherein the casing is movably arranged in unison with the imaging device.

6. The camera according to claim 1, wherein the casing comprises a rear section arranged at a rear side of the imaging device and provided with cooling fins.

7. The camera according to claim 1, wherein the casing comprises a rear section arranged at a rear side of the imaging device and made of a high heat conductivity material.

8. The camera according to claim 6, in which the imaging device has a front side, wherein the rear section is arranged at the rear side of the imaging device opposite to the front side.

9. The camera according to claim 6, wherein the inner space is in fluid communication with the outer space only via the intermediate space formed by the at least one cavity and via a rear passage of the casing arranged at or in the rear section.

10. The camera according to claim 1, wherein the casing comprises a plurality of cavities.

11. The camera according to claim 1, in which the imaging device comprises a lens unit protruding from a front side of the imaging device and in which the at least one cavity comprises an annular cavity, wherein the annular cavity circumferentially encloses the lens unit.

12. The camera according to claim 1, wherein the at least partly transparent housing is a dome window.

13. The camera according to claim 1, wherein the casing has a multi-walled structure comprising an outer wall, an inner wall and a partition wall forming the at least one cavity.

14. The camera according to claim 1, in which the housing has a free volume $V_F$ defined as the difference between a housing volume $V_H$ of the housing and a device volume $V_D$ of the imaging device, wherein the at least one cavity has a cavity volume $V_C$ corresponding to 10-30% of the free volume $V_F$.

15. A method for controlled dew formation inside a camera comprising an at least partly transparent housing and an imaging device arranged inside the at least partly transparent housing, wherein the imaging device is configured to capture images through the at least partly transparent housing, the method comprising:
- arranging a casing between the housing and the imaging device such that the casing at least partly encloses the imaging device, the casing defining at least one cavity forming an intermediate space being in fluid communication with an inner space present between the casing and the imaging device and with an outer space present between the housing and the casing; and
- allowing air to flow from the inner space to the outer space via the intermediate space such that a controlled dew formation on surfaces of the at least one cavity is obtained when dew formation conditions are fulfilled, the dew formation conditions at least including air humidity, ambient temperature outside the camera and temperature inside the inner space.

\* \* \* \* \*